United States Patent
Ibuki

(10) Patent No.: US 10,469,009 B2
(45) Date of Patent: Nov. 5, 2019

(54) EVALUATION SYSTEM, EVALUATION DEVICE, GAME MACHINE, AND EVALUATION METHOD

(71) Applicant: OMRON Corporation, Kyoto-shi, Kyoto (JP)

(72) Inventor: Hiroyuki Ibuki, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 195 days.

(21) Appl. No.: 15/656,009

(22) Filed: Jul. 21, 2017

(65) Prior Publication Data

US 2018/0041149 A1 Feb. 8, 2018

(30) Foreign Application Priority Data

Aug. 5, 2016 (JP) .................. 2016-154142

(51) Int. Cl.
| | |
|---|---|
| *A63F 7/02* | (2006.01) |
| *H02P 7/28* | (2016.01) |
| *H02P 7/29* | (2016.01) |
| *A63F 7/00* | (2006.01) |

(52) U.S. Cl.
CPC ............ *H02P 7/2805* (2013.01); *A63F 7/022* (2013.01); *H02P 7/29* (2013.01); *A63F 2007/0064* (2013.01)

(58) Field of Classification Search
CPC .......... A63F 7/022; H02P 7/2805; H02P 7/29; H02P 29/00; G07F 17/3202
USPC ................................... 463/16–20
See application file for complete search history.

(56) References Cited

U.S. PATENT DOCUMENTS

| | | | | |
|---|---|---|---|---|
| 5,021,735 A | * | 6/1991 | Maass ....................... | G01P 3/46 250/231.18 |
| 2006/0073867 A1 | * | 4/2006 | Rothkranz .......... | G07F 17/3211 463/16 |
| 2009/0254300 A1 | * | 10/2009 | Schneider ................ | G01P 3/44 702/145 |
| 2011/0118013 A1 | * | 5/2011 | Mattice ............... | G07F 17/3202 463/30 |
| 2011/0266986 A1 | * | 11/2011 | Christmann ......... | H02H 7/0833 318/400.21 |
| 2014/0152733 A1 | * | 6/2014 | Sano ........................ | H02P 7/29 347/16 |

(Continued)

FOREIGN PATENT DOCUMENTS

JP 5903804 B2 4/2016

*Primary Examiner* — Michael A Cuff

(74) *Attorney, Agent, or Firm* — Metrolex IP Law Group, PLLC

(57) ABSTRACT

Disclosed are an evaluation system, an evaluation device, a game machine, and an evaluation method for being able to evaluate a drive motor that drives various movable bodies called an accessory attached to a game machine such as a pachinko game machine. The game machine includes an accessory mechanism and a motor control mechanism that controls the drive motor of the accessory mechanism. The evaluation device is connectable to the game machine. The motor control mechanism controls the drive motor by outputting a control signal based on input from the evaluation device, and the motor control mechanism outputs a rotational position and a rotational speed of the controlled drive motor and the control signal to the evaluation device. The evaluation device evaluates the drive motor based on the input rotational position, rotational speed, and control signal.

12 Claims, 6 Drawing Sheets

(56) References Cited

U.S. PATENT DOCUMENTS

2014/0232063 A1    8/2014   Takahashi et al.
2015/0077024 A1*   3/2015   Kuhn ........................ H02P 3/04
                                                                                        318/362

* cited by examiner

FIG. 5

| Evaluation number | Test content | Drive motor control content | Evaluation content | Acceptance condition | Possible rejection cause |
|---|---|---|---|---|---|
| 1 | Acceleration performance test | Drive of drive motor with duty ratio of 100% | Elapsed time until drive motor is accelerated to 90% of maximum speed | ±10% of reference time | • To be caught on operation path<br>• Increase/decrease in friction |
| 2 | Stopping performance test | Reciprocation within predetermined range | Folding-back position | ±1 pulse of reference value | • Increase/decrease in friction<br>• Increase in hunting during deceleration due to backlash of gear |
| 3 | Torque margin test | Constant-speed motion at maximum use speed | Necessary duty ratio at use speed | 90% or less | • Increase in friction<br>• Degradation of drive motor |
| 4 | Low-speed test | Constant-speed motion at minimum use speed | Stopping time during occurrence of stick slip | 20 ms or less | • Increase in static friction<br>• Insufficient accuracy of encoder<br>• Excess backlash of gear |

EVALUATION SYSTEM, EVALUATION DEVICE, GAME MACHINE, AND EVALUATION METHOD

CROSS-REFERENCE TO RELATED APPLICATION

This application is based on Japanese Patent Application No. 2016-154142 filed with the Japan Patent Office on Aug. 5, 2016, the entire contents of which are incorporated herein by reference.

FIELD

The disclosure relates to an evaluation system that evaluates a drive motor driving a movable body provided in a game machine, an evaluation device and a game machine, which are used in the evaluation system, and an evaluation method in which the evaluation system is used.

BACKGROUND

Nowadays, various movable bodies, which are driven with drive motors and called accessories are attached to game machines such as a pachinko game machine. In the accessory, rotation of the drive motor performs various motions such as a linear motion and a rotational motion to enhance a rendering effect.

For example, a stepping motor (for example, see Japanese Patent No. 5903804) and a DC motor are used as the drive motor. In the stepping motor, while rotational position control is easily performed, a problem of step-out occurs when a load on the movable body increases. In the DC motor, when the rotational position control is performed, an encoder synchronizing with rotation of the DC motor is attached, and the rotational position control is performed based on output of the encoder.

An endurance test is performed on the drive motor, and a rotational speed is measured with a laser measurement device, thereby evaluating operation of the drive motor to be controlled.

However, the drive motor is hidden in the game machine when the drive motor is incorporated in the accessory of the game machine, which results in a problem in that the laser measurement device that emits a ray from the outside can hardly be used.

SUMMARY

An object of one or more embodiments of the present invention is to provide an evaluation system that can evaluate the drive motor even if the drive motor is incorporated in the game machine. The evaluation system performs the control such that the drive motor performs evaluation operation, detects the rotational position and/or the rotational speed of the drive motor, and evaluates the drive motor based on a detection result.

Another object of one or more embodiments of the present invention is to provide an evaluation device and a game machine, which are used in the evaluation system.

A still another object of one or more embodiments of the present invention is to provide an evaluation method in which the evaluation system is used.

According to one aspect of the present invention, an evaluation system that performs evaluation of a drive motor driving a movable body provided in a game machine, the game machine includes: a motor controller configured to control operation of the drive motor; and a detector configured to detect at least one of a rotational position and a rotational speed of the drive motor. The evaluation system includes: a command output unit configured to output an evaluation operation command to the motor controller so that the drive motor is controlled by the evaluation operation command to perform evaluation operation; and an evaluation unit configured to evaluate the drive motor, based on a result of the detection by the detector.

The evaluation system may further include: a motor control mechanism incorporated in the game machine, the motor control mechanism comprising the motor controller; and an evaluation device comprising the command output unit and the evaluation unit, the evaluation device being connectable to the game machine. The motor control mechanism outputs the detection result of the detector to an outside of the game machine in which the motor control mechanism is incorporated the detector, the evaluation device is communicably connected to the game machine, the command output unit outputs the evaluation operation command to the motor control mechanism incorporated in the game machine, and the evaluation unit performs the evaluation of the drive motor based on the detection result output from the motor control mechanism incorporated in the game machine.

In the evaluation system, the drive motor may be a DC motor, and the motor controller may output a pulse width modulation (PWM) signal to the drive motor to control the drive motor.

In the evaluation system, the motor controller may perform feedback control of the drive motor based on the detection result of the detector.

In the evaluation system, the command output unit may output the evaluation operation command to the motor controller such that the motor controller performs the evaluation operation to control at least one of a speed and a position of the drive motor, the motor controller may perform the feedback control of the drive motor based on the input evaluation operation command, and the evaluation unit may perform the evaluation of the drive motor by comparing the detection result of the detector to a previously-set reference value.

In the evaluation system, the command output unit may output the evaluation operation command to the motor controller such that the motor controller performs the evaluation operation to control output of the drive motor, and the evaluation unit may perform the evaluation of the drive motor by comparing the detection result of the detector to a previously-set reference value.

According to another aspect of the present invention, an evaluation device that performs evaluation of a drive motor driving a movable body provided in a game machine, the evaluation device includes: a motor controller configured to control the drive motor; a connection unit communicably connectable to the game machine, the game machine comprising a motor controller configured to control the drive motor and a detector configured to detect at least one of a rotational position and a rotational speed of the drive motor; a unit configured to output an evaluation operation command to the game machine such that the motor controller controls the drive motor to perform evaluation operation; a unit configured to receive a detection result of the detector from the game machine; and a unit configured to perform the evaluation of the drive motor based on the received detection result.

According to still another aspect of the present invention, a game machine includes: a movable body; a drive motor configured to drive the movable body; a motor controller configured to control operation of the drive motor; a detector configured to detect at least one of a rotational position and a rotational speed of the drive motor; and a connection unit communicably connectable to an external device. When receiving input of an evaluation operation command from the external device, the drive motor being controlled by the evaluation operation command so as to perform evaluation operation, the motor controller controls the drive motor based on the received evaluation operation command, and outputs a detection result of the detector to the external device.

According to yet another aspect of the present invention, an evaluation method for performing evaluation of a drive motor driving a movable body provided in a game machine, the evaluation method includes: controlling the drive motor to perform evaluation operation using a motor controller; and performing the evaluation of the drive motor based on a detection result of a detector. The game machine includes: the motor controller configured to control operation of the drive motor; and the detector configured to detect at least one of a rotational position and a rotational speed of the drive motor.

The evaluation system, evaluation device, game machine, and evaluation method of one or more embodiments of the present invention can evaluate the drive motor incorporated in the game machine.

In the game machine including the drive motor that drives the movable body, the motor controller that controls the operation of the drive motor, and the detector that detects the rotational position and/or rotational speed of the drive motor, the drive motor is controlled so as to perform the evaluation operation, and the drive motor is evaluated based on the detection result of the detector. Therefore, the drive motor incorporated in the game machine can be evaluated.

BRIEF DESCRIPTION OF THE DRAWINGS

FIG. 5 is a table illustrating an example of various pieces of information in the evaluation processing performed with the evaluation device of the embodiment.

DETAILED DESCRIPTION

Hereinafter, embodiments of the present invention will be described with reference to the drawings. The following embodiments are examples of materialization of the present invention, but the technical scope of the present invention is not limited to the embodiments.

<Entire Game Machine>

Figure 1:
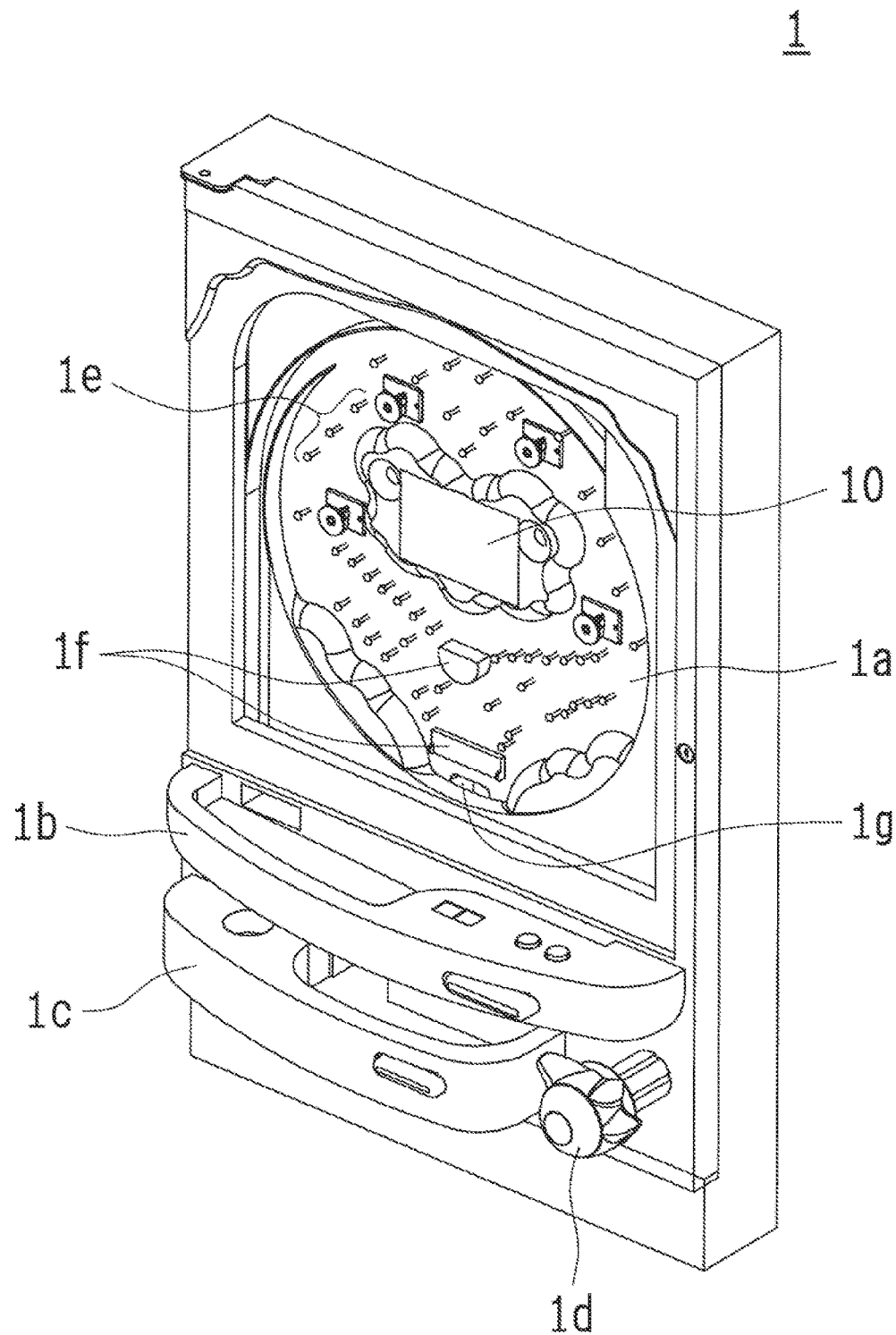
FIG. 1 is a schematic external view illustrating an example of a game machine according to an embodiment of the present invention.

FIG. 1 is a schematic external view illustrating an example of a game machine 1 according to an embodiment of the present invention; FIG. 1 is a perspective view of the game machine 1 when the game machine 1 is viewed from a front and upper right side. FIG. 1 illustrates an example in which the game machine 1 is applied to a pachinko machine of the embodiment. In the game machine 1, various devices such as a game board 1a, an accessory mechanism 10, an upper tray 1b, a lower tray 1c, and a handle unit 1d are attached to a game machine body.

The game board 1a constitutes a game area occupies about two-thirds of an upper front face of the game machine body, and the accessory mechanism 10 that performs various renderings such as image display, sound output, and action of a rendering rod is provided in the center of the game board 1a.

Many pachinko nails 1e that change a course of a game ball are installed in the game board 1a. A winning port 1f through which the game ball is collected as a safe ball and an out port 1g through which the game ball is collected as an out ball are provided with the game board 1a.

The upper tray 1b in which game balls obtained by a game are stored is provided below the game board 1a, and the game balls stored in the upper tray 1b are delivered to a shooting unit (not illustrated). The lower tray 1c into which the game balls overflowed from the upper tray 1b are stored is provided below the upper tray 1b.

The handle unit 1d that receives turning operation of a player is provided on the right of the lower tray 1c in the game machine body, and the player turns the handle unit 1d to shoot the game ball at the game board 1a.

<Accessory Mechanism>

Figure 2:
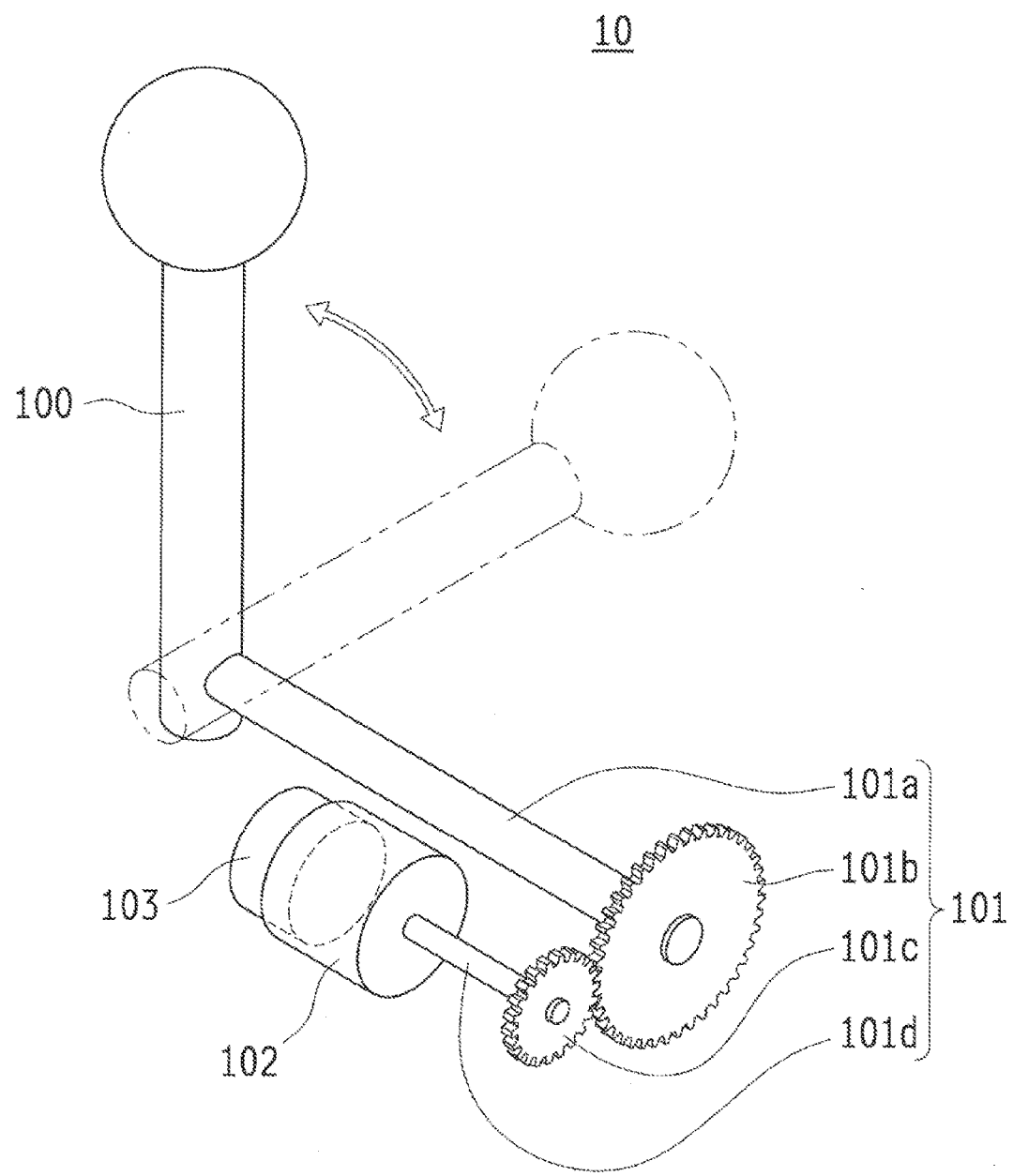
FIG. 2 is a schematic view illustrating an example of a part of an accessory mechanism included in the game machine used in an evaluation system of the embodiment.

FIG. 2 is a schematic diagram illustrating an example of a part of the accessory mechanism 10 included in the game machine 1 used in an evaluation system of the embodiment. FIG. 2 illustrates a movable body 100 that physically performs operation and various components associated with the movable body 100 in the accessory mechanism 10. The accessory mechanism 10 includes a transmission unit 101, a drive motor 102, and an encoder 103 in addition to the movable body 100, such as the rendering rod, which is used in the rendering of the game with the game machine 1.

The movable body 100 is a component called an accessory provided in the front face of the game machine 1, and performs various motions such as a linear motion, a rotational motion, and a rocking motion to enhance a rendering effect. The rendering rod illustrated as the movable body 100 in FIG. 2 is located in a substantially vertical position as illustrated by a solid line in FIG. 2 in a normal state. Although the player cannot visually recognize the movable body 100 from the front, the movable body 100 rocks to a substantially horizontal position as illustrated by a broken line when the game ball enters a specific winning port. The movable body 100 repeats the rocking motion within a range of the vertical position to the horizontal position with a lower end as a rocking center, which allows the player to visually recognize the movable body 100 and to obtain elation caused by the rendering effect of the movable body 100. A position sensor (not illustrated) is provided in the game machine 1 to detect whether the movable body 100 is properly positioned within the rocking range.

The transmission unit 101 is constructed with a first gear 101b supported by a rocking shaft 101a of the movable body 100, a second gear 101c supported by a rotational shaft 101d of the drive motor 102, and transmission members. The transmission unit 101 transmits the rotation of the drive motor 102 to the movable body 100.

The drive motor 102 is constructed with a motor such as a DC motor.

The encoder 103 is partially or wholly incorporated in the drive motor 102, and acts as a detector that detects a rotational position and a rotational speed of the drive motor 102.

<Evaluation System>

Figure 3:
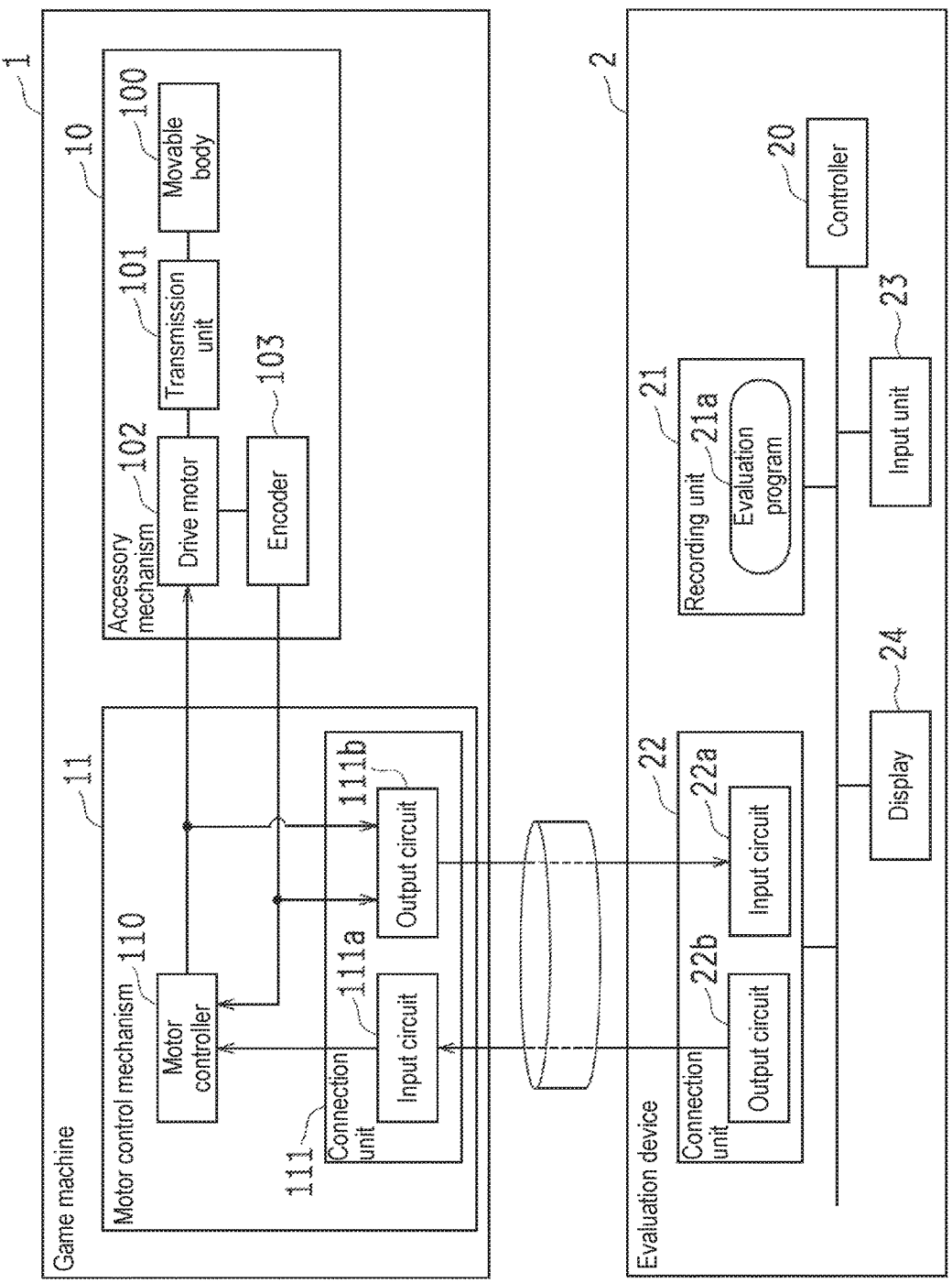
FIG. 3 is a block diagram illustrating an example of configurations of the game machine and an evaluation device, which are used in the evaluation system of the embodiment.

The evaluation system that evaluates the drive motor 102 of the game machine 1 having the above configuration will be described below. FIG. 3 is a block diagram illustrating an example of configurations of the game machine 1 and an evaluation device 2, which are used in the evaluation system of the embodiment. The evaluation device 2 in which a computer such as a notebook computer and a tablet computer is used can be connected to the game machine 1. The evaluation device 2 is connected to the game machine 1, which allows the evaluation device 2 to perform the evaluation associated with the drive motor 102 that drives the movable body 100 provided in the game machine 1.

As described above, the accessory mechanism 10 includes the movable body 100, the transmission unit 101, the drive motor 102, and the encoder 103. The drive motor 102 receives a control signal such as a pulse width modulation (PWM) signal from a motor control mechanism 11, and operates based on the received control signal. The transmission unit 101 transmits the operation of the drive motor 102 to the movable body 100, and the movable body 100 is driven. The encoder 103 that detects the rotational position and rotational speed of the drive motor 102 outputs information indicating the detected rotational position and rotational speed as a detection result to the motor control mechanism 11.

In the motor control mechanism 11, various integrated circuits are mounted on a motor control board. The motor control mechanism 11 includes a motor controller 110 and a connection unit 111 that communicably connects the game machine 1 to an external device.

The motor controller 110 outputs the control signal such as the PWM signal to the drive motor 102 of the accessory mechanism 10 to control the drive of the drive motor 102. In controlling the drive motor 102, the motor controller 110 receives input of the information indicating the rotational position and rotational speed, which is output from the encoder 103 of the accessory mechanism 10, and the motor controller 110 performs feedback control based on the received rotational position and rotational speed. The motor controller 110 controls the drive motor 102 along the progress of the game based on a signal output from a game controller (not illustrated), such as a game read only memory (ROM), which is mounted on the game machine 1. When receiving an evaluation operation command to perform the evaluation operation from the evaluation device 2 connected through the connection unit 111, the motor controller 110 controls the drive motor 102 based on the input evaluation operation command.

The connection unit 111 is constructed with a component such as a connector or a circuit, which connects the game machine 1 to an external device such as the evaluation device 2, and the connection unit 111 can conduct communication with the connected evaluation device 2.

Referring to FIG. 3, the connection unit 111 includes an input circuit 111a that receives input from the evaluation device 2 and an output circuit 111b that outputs various signals to the evaluation device 2. The connection unit 111 and the evaluation device 2 are connected to each other using one bidirectionally communicable line.

The motor control mechanism 11 having the above configuration receives the evaluation operation command output from the evaluation device 2 through the input circuit 111a of the connection unit 111. The motor control mechanism 11 outputs the control signal, such as the PWM signal, which is output from the motor controller 110, and the rotational position and rotational speed of the drive motor 102, which is output from the encoder 103, through the output circuit 111b of the connection unit 111 to the evaluation device 2. Alternatively, in the game machine 1, a connection unit 111 including the input circuit 111a and a connection unit 111 including the output circuit 111b may separately be provided, and the connection units 111 may be connected to the evaluation device 2 using different communication lines. The evaluation device 2 and the motor controller 110 can be connected to each other so as to be wirelessly communicable with each other.

The evaluation device 2 includes a controller 20, a recording unit 21, a connection unit 22, an input unit 23, and a display 24.

The controller 20 is constructed with a processor such as a central processing unit (CPU) and a memory such as a register, and controls the whole evaluation device 2.

The recording unit 21 includes a nonvolatile memory such as a read only memory (ROM) and an erasable programmable read only memory (EPROM), a volatile memory such as a random access memory (RAM), and a recording medium such as a hard disk drive and a semiconductor memory. Various programs and various pieces of data such as information are recorded in the recording unit 21. Various programs such as an evaluation program 21a causing a computer such as a notebook computer to act as the evaluation device 2 and various pieces of information such as data are recorded in a recording area of the recording unit 21.

The connection unit 22 is constructed with a component such as a connector or a circuit, which connects the evaluation device 2 to the external device such as the game machine 1, and the connection unit 22 can conduct communication with the connected game machine 1. Referring to FIG. 3, the connection unit 22 includes an input circuit 22a that receives input from the game machine 1 and an output circuit 22b that outputs various signals to the game machine 1. The connection unit 22 and the game machine 1 are connected to each other using one bidirectionally communicable line.

The input unit 23 is a user interface, such as a keyboard and a mouse, which can be operated by a user. The input unit 23 receives input of various pieces of information based on the user's operation, and transfers the pieces of information to the controller 20.

The display 24 is a user interface, such as a liquid crystal monitor, which displays various pieces of information to the user. The display 24 displays the pieces of information under the control of the controller 20.

The computer, such as the notebook computer and a tablet computer, reads various programs, such as the evaluation program 21a, which are recorded in the recording unit 21, and executes various steps included in the evaluation program 21a under the control of the controller 20, thereby acting as the evaluation device 2.

<Evaluation Processing>

Figure 4:
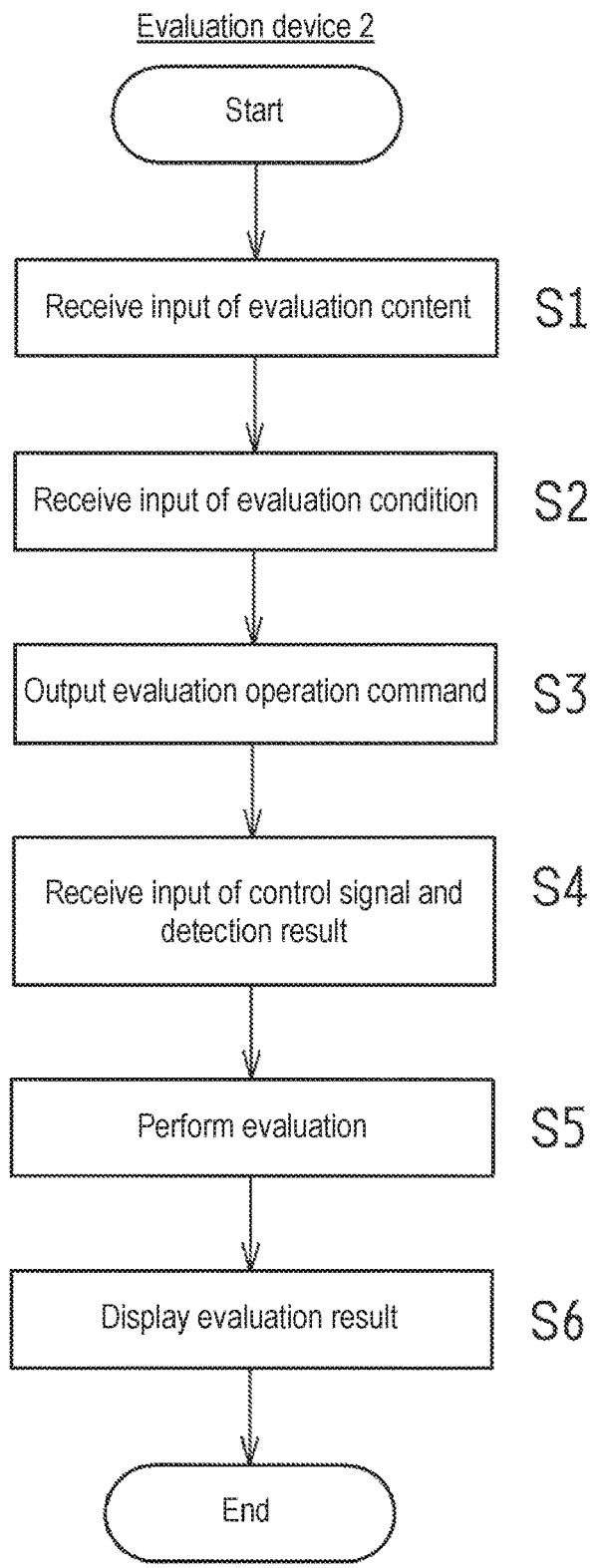
FIG. 4 is a flowchart illustrating an example of evaluation processing performed with the evaluation device of the embodiment.

Processing of each device included in the above evaluation system will be described below. FIG. 4 is a flowchart illustrating an example of evaluation processing performed with the evaluation device 2. In the case that the evaluation is performed for the drive motor 102 that drives the movable body 100 provided in the game machine 1, the user (in this case, a person who inspects the game machine 1) connects the connection unit 111 of the game machine 1 in which the drive motor 102 of an evaluation target is incorporated and the connection unit 22 of the evaluation device 2 to each other using the communication line. The user operates the input unit 23 of the evaluation device 2 to activate the evaluation program 21*a*, and performs input of an evaluation content associated with the drive motor 102, input of an evaluation condition, and the like. The evaluation content means a content of a test, such as an acceleration performance test and a stopping performance test, which is associated with the drive motor 102. For example, in the acceleration performance test, "an elapsed time until the drive motor 102 is accelerated to 90% of a maximum speed" is an event of the evaluation target. For example, the user can input the evaluation content by selecting a desired test from plural previously-recorded tests. The evaluation condition means a criterion as to whether the result of the test is accepted. For example, in the acceleration performance test, "±10% of a reference time" is input as the evaluation condition indicating the acceptance criterion for the test. For example, the user can input the evaluation condition by designating a previously-recorded setting value or changing the setting value.

The controller 20 of the evaluation device 2 receives the evaluation content from the input unit 23 (step S1), and also receives the evaluation condition (step S2). Based on the received evaluation content and evaluation condition, the controller 20 outputs the evaluation operation command to the game machine 1 through the connection unit 111 such that the drive motor 102 is controlled so as to perform the evaluation operation (step S3). In step S3, for example, in the case that the test based on the evaluation content is the acceleration performance test, the controller 20 outputs the evaluation operation command to "drive the drive motor 102 with a duty ratio of 100%".

When receiving the evaluation operation command from the evaluation device 2 through the connection unit 111, the game machine 1 controls the drive motor 102 based on the received evaluation operation command. The motor controller 110 of the motor control mechanism 11 outputs the control signal such as the PWM signal to the accessory mechanism 10 based on the evaluation operation command, thereby controlling the drive motor 102.

In the accessory mechanism 10, the drive motor 102 that receives the control signal drives the movable body 100 through a transmission mechanism based on the input control signal. The encoder 103 detects the rotational position and rotational speed of the operating drive motor 102, and outputs information indicating the detected rotational position and rotational speed as the detection result to the motor control mechanism 11.

The motor controller 110 performs the feedback control of the drive motor 102 based on the detection result output from the accessory mechanism 10. The control signal output from the motor controller 110 to the accessory mechanism 10 and the detection result received from the accessory mechanism 10 are output to the evaluation device 2 through the connection unit 111.

The controller 20 of the evaluation device 2 receives the control signal and the detection result from the game machine 1 through the connection unit 22 (step S4), evaluates the drive motor 102 based on the received control signal and detection result (step S5), and displays an evaluation result on the display 24 (step S6). The evaluation is performed based on the evaluation condition received in step S2 and the control signal and detection result, which are received in step S4. In step S6, acceptance or rejection is displayed as the evaluation result, and a possible cause is displayed in the case that the evaluation result is the rejection.

Thus, the evaluation processing is performed with the evaluation device 2.

An evaluation example in the evaluation processing will specifically be described below. FIG. 5 is a table illustrating an example of various pieces of information in the evaluation processing performed with the evaluation device 2. FIG. 5 illustrates examples of an evaluation number associated with the evaluation, a test content, a drive motor control content, an evaluation content, an acceptance condition, and a possible rejection cause in a table form. A part or whole of the table in FIG. 5 is recorded in the recording unit 21 of the evaluation device 2, and referred to from the controller 20 in the evaluation processing.

The evaluation number is used to identify the evaluation processing, and pieces of information such as the test content, the drive motor control content, the evaluation content, the acceptance condition, and the possible rejection cause are recorded in the evaluation device 2 while correlated with the evaluation number.

The test content is one of the evaluation contents input in step S1 of the evaluation processing, and is a test content about the evaluation. FIG. 5 illustrates an acceleration performance test, a stopping performance test, a torque margin test, and a low-speed test as the evaluation processing.

The drive motor control content is information about the evaluation operation command output in step S3 of the evaluation processing. For example, the drive motor control content is "to drive the drive motor 102 with the duty ratio of 100%" for the acceleration performance test, the drive motor control content is "reciprocation within a predetermined range" for the stopping performance test, the drive motor control content is "constant-speed motion at a maximum use speed" for the torque margin test, and the drive motor control content is "constant-speed motion at a minimum use speed" for the low-speed test.

The evaluation content is one of the evaluation contents input in step S1 of the evaluation processing, and is information indicating the event of the evaluation target. For example, the evaluation content is "the elapsed time until the drive motor 102 is accelerated to 90% of the maximum speed" for the acceleration performance test, the evaluation content is "a folding-back position" for the stopping performance test, the evaluation content is "a necessary duty ratio at a use speed" for the torque margin test, and the evaluation content is "a stopping time during occurrence of stick slip" for the low-speed test.

The acceptance condition is information, which is input in step S2 of the evaluation processing and used in the evaluation in step S5, and is a condition indicating the acceptance criterion for the event of the evaluation content. For example, "the elapsed time until the drive motor 102 is accelerated to 90% of the maximum speed" is "±10% of the reference time" for the acceleration performance test, "the folding-back position" is "±1 pulse of the reference value" for the stopping performance test, "the necessary duty ratio at the use speed" is "90% or less" for the torque margin test, and "the stopping time during the occurrence of the stick slip" is "20 ms or less" for the low-speed test.

The possible rejection cause is information displayed on the display 24 in the case that the evaluation result is the rejection in step S6 of the evaluation processing. For example, "to be caught on an operation path" and the like are a possible cause in the case that the drive motor 102 fails to the acceleration performance test, "an increase/decrease in friction" and the like are a possible cause in the case that the drive motor 102 fails to the stopping performance test, "an increase in friction" and the like are a possible cause in the case that the drive motor 102 fails to the torque margin test, and "an increase in static friction" and the like are a possible cause in the case that the drive motor 102 fails to the low-speed test.

Figure 6:
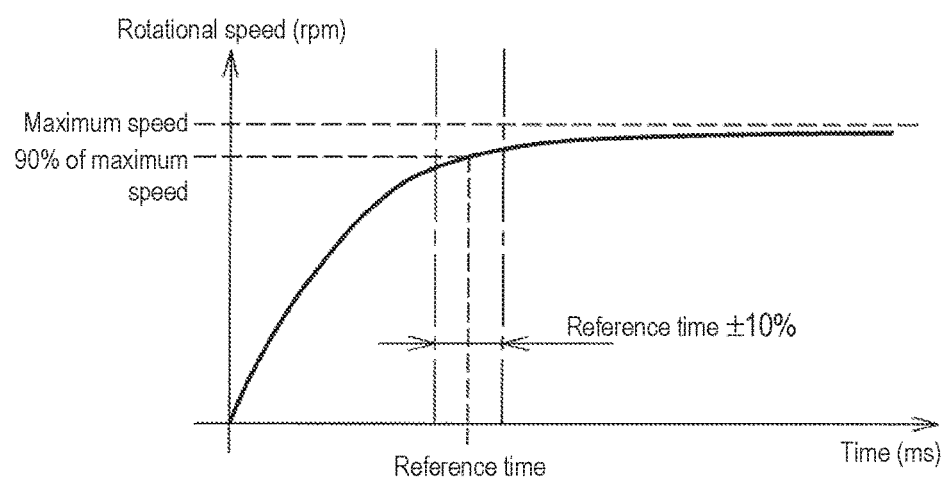
FIG. 6 is a graph illustrating an example of a behavior of a drive motor in the evaluation processing performed with the evaluation device of the embodiment.

An evaluation example in the evaluation processing will specifically be described below with respect to the acceleration performance test. FIG. 6 is a graph illustrating an example of a behavior of the drive motor 102 in the evaluation processing performed with the evaluation device 2. In FIG. 6, a horizontal axis indicates time and a vertical axis indicates a rotational speed of the drive motor 102. A relationship between the elapsed time from the starting of the drive of the drive motor 102 and the rotational speed is illustrated by a solid line in FIG. 6. In the acceleration performance test, the drive motor 102 is driven with the duty ratio of 100%, and ±10% of the reference time becomes an acceptance criterion with respect to the elapsed time until the drive motor 102 is accelerated to 90% of the maximum speed. When the drive motor 102 is driven with the duty ratio of 100%, as illustrated by the solid line in the graph of FIG. 6, the rotational speed increases, and gradually comes close to the maximum speed beyond 90% of the maximum speed. The elapsed time until the rotational speed reaches 90% of the maximum speed is compared to the reference time, and the evaluation result is the acceptance in the case that the elapsed time falls within ±10% of the reference time. The evaluation device 2 performs these evaluations based on the output from the motor controller 110 and the detection results of the rotational position and rotational speed of the drive motor 102. To be caught on the operation path, the increase in friction, and the like are a possible cause in the case that the elapsed time until the rotational speed reaches the 90% of the maximum speed is longer than +10% of the reference time. The decrease in friction and the like are a possible cause in the case that the elapsed time until the rotational speed reaches the 90% of the maximum speed is shorter than −10% of the reference time.

Thus, in the evaluation system of the embodiment, the evaluation device 2 is connected to the game machine 1, the evaluation device 2 outputs the evaluation operation command to the motor control mechanism 11 incorporated in the game machine 1, and the motor control mechanism 11 controls the drive motor 102 that drives the movable body 100 based on the evaluation operation command. The motor control mechanism 11 outputs the detection results of the rotational position and rotational speed of the drive motor 102 to the evaluation device 2. The evaluation device 2 evaluates the drive motor 102 based on the detection results. Therefore, the evaluation system has such an excellent effect that the operation of the drive motor 102 can easily be evaluated.

The present invention is not limited to the above embodiments, but various embodiments can be made. The above embodiment is described only by way of example, but not restrictive. The scope of the present invention is indicated by the appended claims rather than by the foregoing description. Any change and modification belonging to a range equivalent to the claims fall within the present invention.

For example, in the above embodiment, the motor control mechanism 11 and the accessory mechanism 10 are incorporated in the game machine 1, and the game machine 1, which is attached externally, outputs the evaluation operation command to the motor control mechanism 11. Alternatively, the evaluation program 21a may be incorporated in the motor control mechanism 11. Additionally, the evaluation result can be displayed on a display unit incorporated in the game machine 1.

In the above embodiment, the DC motor is used as the drive motor 102. Alternatively, other motors such as an AC motor may be used as the drive motor 102. In controlling the drive motor 102, the motor controller 110 does not necessarily perform the feedback control. For example, in the acceleration performance test, the motor controller 110 may control the drive motor 102 without performing the feedback control. The evaluation may be performed based on one of or both the control signal output from the motor controller 110 and the rotational position and rotational speed, which are of the detection results.

As described above, the evaluation system of one or more embodiments of the present invention can be developed to various modes.

The invention claimed is:

1. An evaluation system for evaluating a drive motor that drives a movable body provided in a game machine, the game machine comprising:
    a motor controller configured to control operation of the drive motor; and
    a detector configured to detect at least one of: a rotational position of the drive motor; and a rotational speed of the drive motor,
    the evaluation system comprising:
    a command output unit configured to output an evaluation operation command to the motor controller so that the drive motor is controlled by the evaluation operation command to perform at least one of a plurality of evaluation operations; and
    an evaluation unit configured to evaluate the drive motor, based on a detection result detected by the detector in response to the drive motor performing the at least one of the plurality of evaluation operations.

2. The evaluation system according to claim 1, wherein:
    the game machine further comprises a motor control mechanism comprising the motor controller;
    the evaluation system further comprises an evaluation device comprising the command output unit and the evaluation unit, the evaluation device being communicably connected to the game machine;
    the motor control mechanism outputs the detection result to the evaluation system, wherein the evaluation system is located outside of the game machine;
    the command output unit outputs the evaluation operation command to the motor control mechanism; and
    the evaluation unit performs the evaluation of the drive motor based on the detection result.

3. The evaluation system according to claim 1, wherein the drive motor comprises a DC motor, and the motor controller outputs a pulse width modulation signal to the drive motor to control the drive motor.

4. The evaluation system according to claim 1, wherein the motor controller performs feedback control of the drive motor based on the detection result.

5. The evaluation system according to claim 4, wherein:
    the command output unit outputs the evaluation operation command to the motor controller such that the motor controller performs the at least one of the plurality of evaluation operations to control at least one of: the rotational speed of the drive motor; and the rotational position of the drive motor;

the motor controller performs the feedback control of the drive motor based on the evaluation operation command; and the evaluation unit performs the evaluation of the drive motor by comparing the detection result to a previously-set reference value.

6. The evaluation system according to claim 1, wherein:

the command output unit outputs the evaluation operation command to the motor controller such that the motor controller performs the evaluation operation to control output of the drive motor; and the evaluation unit performs the evaluation of the drive motor by comparing the detection result to a previously-set reference value.

7. An evaluation device that performs evaluation of a drive motor driving a movable body provided in a game machine, the evaluation device comprising:

a connection unit communicably connectable to the game machine, the game machine comprising: a motor controller configured to control the drive motor; and a detector configured to detect at least one of: a rotational position of the drive motor; and a rotational speed of the drive motor;

a command output unit configured to output an evaluation operation command to the game machine such that the motor controller controls the drive motor to perform at least one of a plurality of evaluation operations;

an input unit configured to receive a detection result detected by the detector in response to the drive motor performing the at least one of the plurality of evaluation operations; and an evaluation unit configured to perform the evaluation of the drive motor based on the detection result.

8. A game machine comprising:

a movable body;

a drive motor configured to drive the movable body;

a motor controller configured to control operation of the drive motor;

a detector configured to detect at least one of: a rotational position of the drive motor; and a rotational speed of the drive motor; and a connection unit communicably connectable to an external device, wherein in response to receiving input of an evaluation operation command from the external device, the motor controller controls the drive motor based on the evaluation operation command to perform at least one of a plurality of evaluation operations, the detector detects a detection result in response to the drive motor performing the at least one of the plurality of evaluation operations, and the connection unit outputs the detection result to the external device.

9. An evaluation method for performing evaluation of a drive motor driving a movable body provided in a game machine, the evaluation method comprising:

controlling the drive motor to perform at least one of a plurality of evaluation operations using a motor controller; and evaluating the drive motor based on a detection result detected by a detector in response to the drive motor performing the at least one of the plurality of evaluation operations, wherein the game machine comprises:

the motor controller configured to control operation of the drive motor; and the detector configured to detect at least one of: a rotational position of the drive motor; and a rotational speed of the drive motor.

10. The method according to claim 9, wherein controlling the drive motor comprises controlling the drive motor via pulse width modulation.

11. The method according to claim 9, further comprising performing feedback control of the drive motor based on the detection result.

12. The method according to claim 11, wherein:

controlling the drive motor to perform the at least one of the plurality of evaluation operations using the motor controller comprises controlling the drive motor to perform the at least one of the plurality of evaluation operations using the motor controller to control at least one of: the rotational speed of the drive motor; and the rotational position of the drive motor;

performing feedback control of the drive motor based on the detection result comprises performing feedback control of the drive motor based on an evaluation operation command; and evaluating the drive motor based on the detection result detected by the detector in response to the drive motor performing the at least one of the plurality of evaluation operations comprises comparing the detection result to a previously-set reference value.

* * * * *